(12) United States Patent (10) Patent No.: US 10,793,108 B2
Gersabeck et al. (45) Date of Patent: Oct. 6, 2020

(54) BLUETOOTH-ENABLED KEY FOB

(71) Applicant: FORD GLOBAL TECHNOLOGIES, LLC, Dearborn, MI (US)

(72) Inventors: David Marvin Gersabeck, Commerce Township, MI (US); Ziad Alhihi, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/185,555

(22) Filed: Nov. 9, 2018

(65) Prior Publication Data

US 2020/0148167 A1 May 14, 2020

(51) Int. Cl.
 *B60R 25/24* (2013.01)
 *B60R 25/20* (2013.01)
 *B60R 25/23* (2013.01)

(52) U.S. Cl.
 CPC ............ *B60R 25/24* (2013.01); *B60R 25/209* (2013.01); *B60R 25/23* (2013.01); *B60R 25/246* (2013.01); *B60R 2325/101* (2013.01); *B60R 2325/205* (2013.01)

(58) Field of Classification Search
 CPC ............ G07C 9/00142; G07C 9/00571; G07C 9/0069; G07C 9/00039; G07C 9/00309; G07C 9/00111; G07C 9/00896; G07C 9/00103; G07C 2209/62; G07C 2009/00793; B60R 25/24; B60R 25/209; B60R 25/23; B60R 25/246; B60R 2325/101; B60R 2325/205
 USPC ....................................................... 340/5.54
 See application file for complete search history.

(56) References Cited

U.S. PATENT DOCUMENTS

| | | | | |
|---|---|---|---|---|
| 6,051,958 | A * | 4/2000 | Hwang | H01M 10/46 320/161 |
| 6,271,642 | B1 * | 8/2001 | Dougherty | G08B 29/181 320/104 |
| 6,291,968 | B1 * | 9/2001 | Nantz | H02J 7/02 320/108 |
| 6,700,352 | B1 * | 3/2004 | Elliott | H02J 7/0013 320/130 |
| 9,536,364 | B2 | 1/2017 | Talty et al. | |
| 9,774,210 | B1 * | 9/2017 | Wright | G08B 21/0219 |
| 9,932,013 | B2 * | 4/2018 | Hall | B60R 25/24 |
| 10,538,220 | B1 * | 1/2020 | Tyagi | B60R 25/24 |
| 2005/0134477 | A1 * | 6/2005 | Ghabra | B60R 25/246 340/13.24 |
| 2006/0132091 | A1 * | 6/2006 | Felder | H02J 7/0086 320/128 |
| 2006/0255908 | A1 * | 11/2006 | Gilbert | B60R 25/24 340/5.61 |

(Continued)

OTHER PUBLICATIONS

Nofuente, Kyle, "Tesla Has a Bluetooth LE Key Fob That Makes It Impossible to Lose Your Car Keys," Tech Times, Nov. 10, 2015.

*Primary Examiner* — Munear T Akki
(74) *Attorney, Agent, or Firm* — Michael J. Spenner; Brooks Kushman P.C.

(57) ABSTRACT

A system includes a mobile device and a fob, each having a short-range wireless transceiver. The mobile device is programmed to transmit a message to the fob indicating a fob action using the mobile device transceiver. The fob is programmed to, using the fob transceiver, receive the message and transmit a second message to a vehicle requesting the vehicle to perform the fob action.

16 Claims, 9 Drawing Sheets

(56) References Cited

U.S. PATENT DOCUMENTS

| | | | | |
|---|---|---|---|---|
| 2007/0040449 | A1* | 2/2007 | Spurlin | A61M 5/14244 307/64 |
| 2009/0146610 | A1* | 6/2009 | Trigiani | H02J 7/0018 320/119 |
| 2010/0039215 | A1* | 2/2010 | Proefke | B60R 25/24 340/5.1 |
| 2012/0235823 | A1* | 9/2012 | Trock | H01M 16/00 340/636.1 |
| 2013/0143594 | A1* | 6/2013 | Ghabra | H04L 63/1416 455/456.1 |
| 2013/0237174 | A1* | 9/2013 | Gusikhin | H04W 4/90 455/404.1 |
| 2014/0104771 | A1* | 4/2014 | Colan | G08C 17/02 361/679.4 |
| 2014/0114503 | A1* | 4/2014 | Ghabra | H04Q 9/00 701/2 |
| 2014/0240086 | A1* | 8/2014 | Van Wiemeersch | G05B 1/00 340/5.51 |
| 2014/0274013 | A1* | 9/2014 | Santavicca | G07C 9/00309 455/418 |
| 2015/0175127 | A1* | 6/2015 | Hatton | G06F 17/00 455/420 |
| 2015/0287257 | A1* | 10/2015 | Thompson | G07C 9/00309 340/5.72 |
| 2016/0101745 | A1* | 4/2016 | Siswick | G07C 9/00309 701/2 |
| 2017/0120867 | A1* | 5/2017 | Beauvais | B60R 25/24 |
| 2018/0096542 | A1* | 4/2018 | Mader | G07C 5/085 |
| 2018/0326947 | A1* | 11/2018 | Oesterling | G07C 9/00571 |
| 2019/0007900 | A1* | 1/2019 | Lei | H04L 12/40 |
| 2019/0047514 | A1* | 2/2019 | Brombach | B60R 25/241 |
| 2019/0136815 | A1* | 5/2019 | Rhodes | H04W 4/02 |
| 2020/0079322 | A1* | 3/2020 | Crocker | B60R 25/246 |

* cited by examiner

BLUETOOTH-ENABLED KEY FOB

TECHNICAL FIELD

Aspects of the disclosure generally relate to a key fob that support multiple vehicles and multiple frequencies to connect to the vehicles via a BLUETOOTH low energy module (BLEM).

BACKGROUND

Vehicle key fobs may be used to allow a user to gain access to a vehicle. Some fob devices operate such that when a key is pressed on the fob, the device sends a code to the vehicle to instruct the vehicle to unlock the vehicle. Passive-entry key fobs operate to provide response to a challenge pulse train sent by the vehicle, where if a proper response is received by the vehicle then the door may be unlocked by a user grasping the door handle.

Phone-as-a-key (PaaK) systems are being introduced to allow users to utilize their phones to unlock a vehicle without requiring a key fob device. These systems may operate similar to a key fob, but where the phone communicates with the vehicle over BLUETOOTH or other mobile device wireless technologies.

SUMMARY

In one or more illustrative examples, a system includes a mobile device and a fob, each having a short-range wireless transceiver. The mobile device is programmed to transmit a message to the fob indicating a fob action using the mobile device transceiver, and the fob is programmed to, using the fob transceiver, receive the message and transmit a second message to a vehicle requesting the vehicle to perform the fob action.

In one or more illustrative examples, a method includes transitioning a fob into valet mode by sending a wireless short-range message to the fob responsive to receiving input to a mobile device to set the fob into valet mode; and transitioning the fob from valet mode into full access mode by sending a second wireless short-range message to the fob responsive to receiving second input to the mobile device to remove the fob from valet mode.

In one or more illustrative examples, a system includes a mobile device and a fob, each having a short-range wireless transceiver. The mobile device is programmed to, responsive to user input, transmit a message using the mobile device transceiver to the fob to transition the fob from being configured to control a first vehicle profile to being configured to control a second vehicle profile, and the fob is programmed to, using the fob transceiver, receive the message and control the second vehicle.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
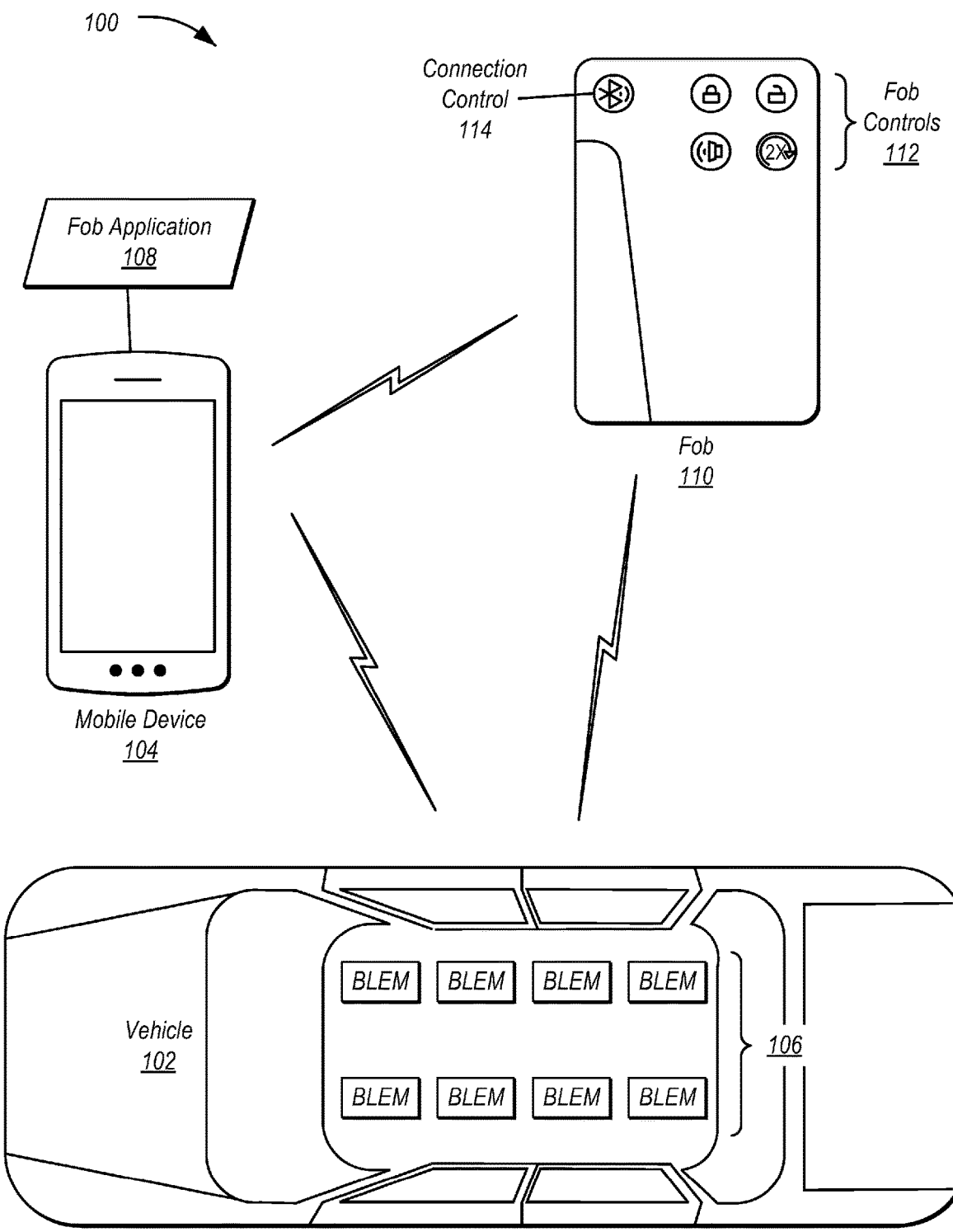
FIG. 1 illustrates an example system including a fob configured for communication with a mobile device and with a vehicle.

FIG. 1 illustrates an example system including a fob 110 configured for communication with a mobile device 104 and with a vehicle 102. The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of vehicle 102 may vary, the capabilities of the vehicle 102 may correspondingly vary. As some other possibilities, vehicles 102 may have different capabilities with respect to passenger capacity, towing ability and capacity, and storage volume.

The mobile device 104 may be any of various types of portable computing device, such as cellular phones, tablet computers, smart watches, laptop computers, portable music players, or other devices having processing and communications capabilities. The mobile device 104 may include one or more processors configured to execute computer instructions, and a storage medium on which the computer-executable instructions and/or data may be maintained. The mobile device 104 may further include various wireless transceivers, such as a BLUETOOTH or BLE transceiver.

The vehicle 102 may include an array of BLEMs 106 that may be configured to facilitate communication between the mobile device 104 and the vehicle 102. For instance, each BLEM 106 may be connected to one or more antennas to form an array that may be used to triangulate or otherwise detect the location of the mobile device 104. The BLEMs 106 may be further configured to send and receive messaging between the mobile device 104 and the vehicle 102, e.g., to provide for the performance of challenge-response sequences and/or to receive commands from the vehicle 102. In an example, the fob 110 may connect to the closest-detected BLEM of the BLEM 106 antennas in the vehicle 102. As shown the vehicle 102 includes eight BLEMs 106, but it should be noted that implementations may include more or fewer antennas.

The fob application 108 may include instructions that, when executed by the one or more processors of the mobile device 104, cause the mobile device 104 to perform operations to facilitate access to the vehicle 102. In an example, the fob application 108 may cause the mobile device 104 to display a user interface including controls similar to those of a key fob, e.g., lock, unlock, start, etc. In another example, fob application 108 may cause the mobile device 104 to interact as a passive entry device with the vehicle 102, providing presence information to the BLEMs 106 that allows the vehicle 102 to detect that an authorized used of the vehicle 102 is nearby.

By executing the fob application 108 to control communication of the mobile device 104 with the BLEMs 106 of the vehicle 102, the mobile device 104 may be used to unlock, start, or otherwise access the vehicle 102. However, establishing a stable connection between the mobile device 104 and the BLEMs 106 can be challenging in certain environmental conditions. Moreover, if the mobile device 104 is lost or has insufficient battery charge remaining, the user may be unable to send commands to the vehicle 102 from the mobile device 104, effectively causing the user to be locked out of the vehicle 102. As many PaaK systems do not include a physical key, the user may have no backup method to gain access to the vehicle 102. Yet further, many PaaK systems lack valet mode functionality.

The fob 110 is an electronic communications device configured to allow a user to gain access to a vehicle 102. Some fobs 110 operate such that when a button or other control is pressed on the fob 110, the fob 110 sends a code to the vehicle 102 to instruct the vehicle 102 to unlock. Passive-entry key fobs 110 operate to provide response to a challenge pulse train sent by the vehicle 102, where if a proper response is received by the vehicle 102 then the door may be unlocked by the user grasping the door handle.

As shown, the fob 110 includes fob controls 112 which may be used to select access functions to be performed to the vehicle 102. In an example, the fob controls 112 may include an unlock button that when selected causes the fob 110 to attempt to unlock the vehicle 102, a lock button that that when selected causes the fob 110 to attempt to lock the vehicle 102, a panic button that when selected causes the fob 110 to attempt to trigger the vehicle 102 alarm, and a remote start button that when selected causes the fob 110 to attempt to start the vehicle 102.

The fob 110 may be further configured to include BLUETOOTH, BLE, or other local communication functionality. This may allow the fob 110 to connect directly to the BLEMs 106 (e.g., the closest BLEM 106), without use of the mobile device 104. The fob 110 may accordingly make use of the BLUETOOTH capabilities of the PaaK system via the BLEM 106 to allow the fob 110 to operate as a backup to the mobile device 104. As the same vehicle functionality would be used by the fob 110 and the mobile device 104, this solution does not require hardware changes to PaaK-enabled vehicles 102.

The fob may include a connection control 114 to facilitate the connection or reconnection of the fob 110 to various BLUETOOTH devices. In one example, a single press of the connection control 114 may power on the BLUETOOTH chipset of the fob 110 and direct the fob 110 to attempt to reconnect the last bonded device (e.g., mobile device 104), while a long press event may cause the fob 110 to power on the BLUETOOTH chipset and also go into discovery mode, advertising the fob 110 for a predefined period of time (e.g., one minute) to allow a new mobile device 104 to be paired to the fob 110.

Figures 2A, 2B:
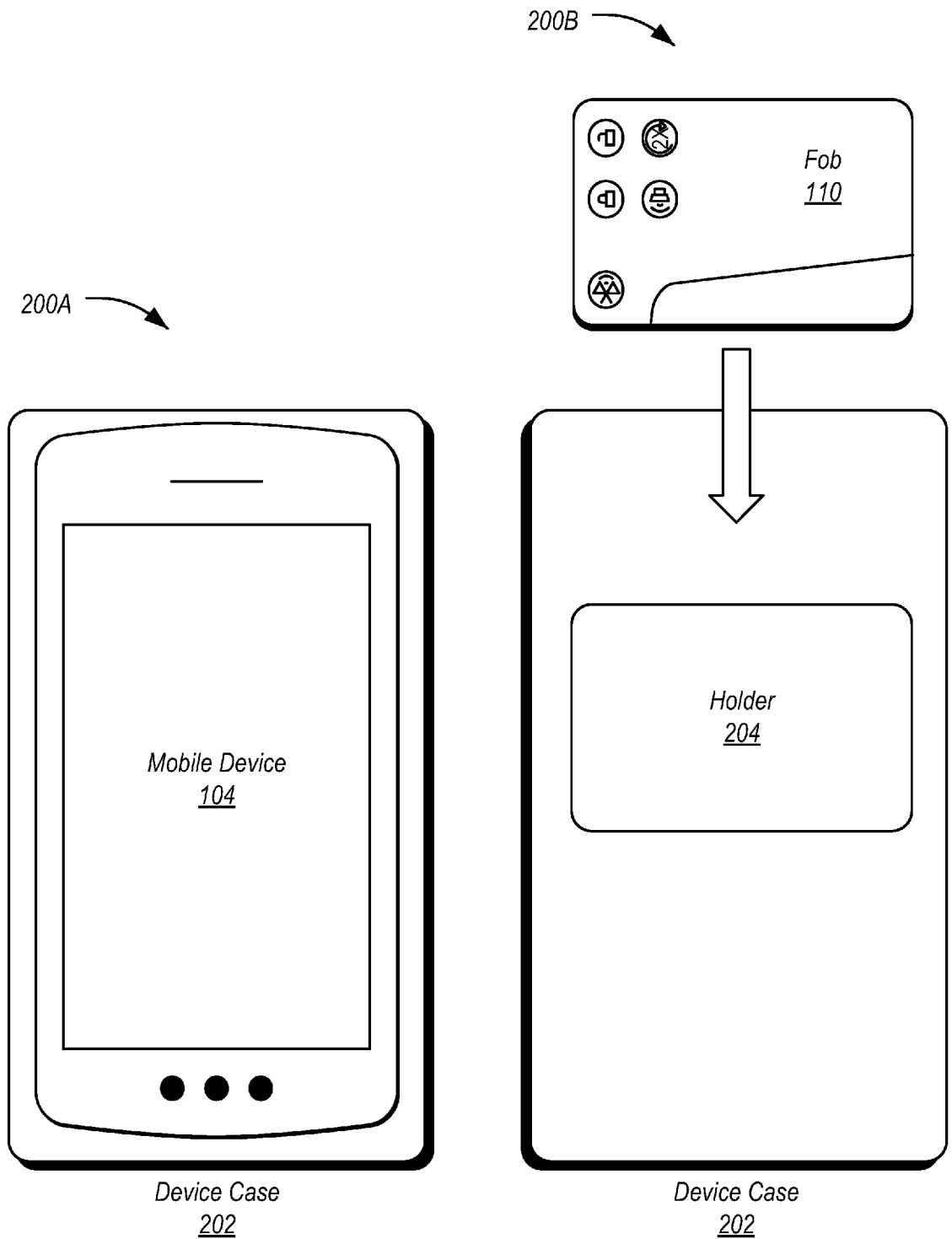
FIG. 2A illustrates an example front view of a device case configured to hold a mobile device.
FIG. 2B illustrates an example rear view of the device case illustrating a holder into which a fob may be placed.

FIG. 2A illustrates an example front view 200A of a device case 202 configured to hold the mobile device 104. The device case 202 may include any of various devices that can house the mobile device 104. In an example, the device case 202 may be composed of a plastic or rubber material, but in other examples the device case 202 may use a variety of other materials, such as wood, metal, or fiber.

FIG. 2B illustrates an example rear view 200B of the device case 202 illustrating a holder 204 into which the fob 110 may be placed. The holder 204 may include, as some nonlimiting examples, a recess, dock, slot or other mechanism by which the fob 110 device may be fixed or otherwise coupled to the device case 202. The fob 110 may be formed into the shape of a card that fits into the device case 202 of the mobile device 104. This may allow the fob 110 to be available as a backup to facilitate vehicle 102 entry without requiring the user to carry a separate fob 110 device. However, the fob 110 may be removeable from the device case 202 and in that removed configuration may function as a regular key fob 110, without requiring the use of the mobile device 104.

Referring back to FIG. 1, the fob application 108 may be further programmed to allow for the configuration of the operation of the fob 110. In an example, the fob application 108 may be configured to configure to utilize the mobile device 104 to program the fob 110 over a BLE connection. This would allow the fob 110 to be configurable without the fob 110 having other connectivity functions. For instance, the fob application 108 may allow the user to utilize the fob 110 with multiple vehicles 102. In one example, the fob application 108 may allow the user to learn transceiver codes for up to four vehicles 102. Using the fob application 108, the user can switch which of the vehicles 102 is the active vehicle 102 to be controlled by the fob 110, as well as to update the frequencies or other settings used by the fob 110.

Figure 3:
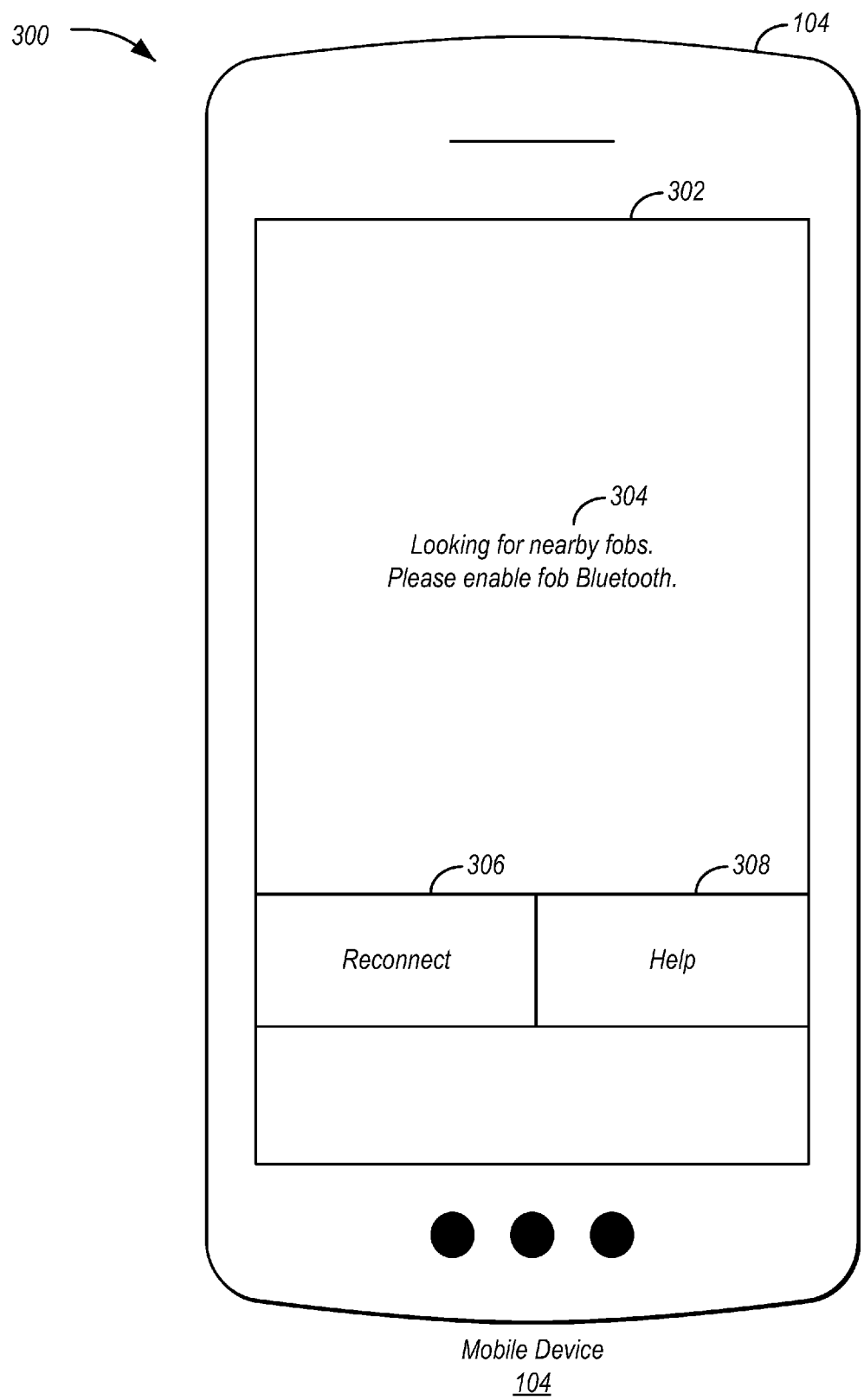
FIG. 3 illustrates an example of a user interface of the fob application for connecting the mobile device to a fob.

FIG. 3 illustrates an example 300 of a user interface 302 of the fob application 108 for connecting the mobile device 104 to a fob 110. In an example, the user interface 302 may be displayed by the fob application 108 to the screen of the mobile device 104 if no fob 110 is detected by the mobile device 104. The user interface 302 may include a message 304 indicating to the user that the fob application 108 is looking for nearby fobs 110. The message 304 may further indicate that the user should be sure to enable BLUETOOTH for the fob. In one example, the user may press and hold the connection control 114 of the fob 110 to place the fob 1110 into discovery mode. The user interface 302 may also include a reconnect control 306 that, when selected, allows the user to request for the mobile device 104 to again search for fobs 110, and a help control 308 that, when selected, cause the fob application 108 to display further information regarding the operation of the fob application 108.

Figure 4:
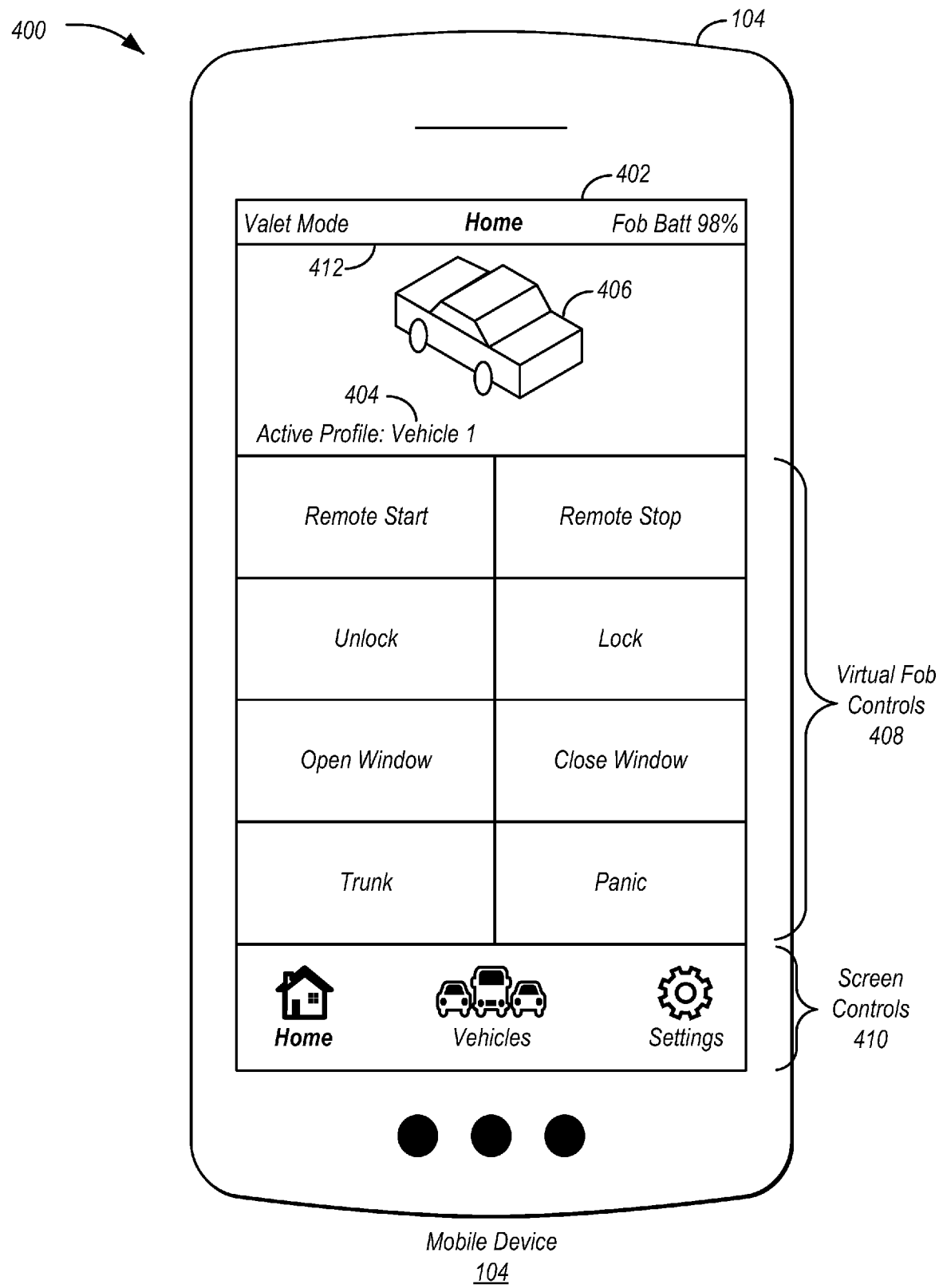
FIG. 4 illustrates an example of a home user interface of the fob application for controlling a vehicle specified by an active profile.

FIG. 4 illustrates an example 400 of a home user interface 402 of the fob application 108 for controlling a vehicle 102 specified by an active profile. The fob 110 may be configurable to control multiple vehicles 102. As shown in the active profile label 404, the fob 110 is currently configured to control "vehicle 1". The user interface 402 may further provide an illustration 406 providing a representation of the active vehicle 102. This representation may be an image of the same make, model, and/or color of the active vehicle 102.

The user interface 402 further includes a set of virtual fob controls 408 configured to select access functions to be performed to the vehicle 102 indicated as being active in the active profile label 404. As shown, the virtual fob controls 408 may include a remote start button that when selected causes the fob application 108 to direct the fob 110 to attempt to start the vehicle 102, a remote stop button that when selected causes the fob application 108 to direct the fob 110 to attempt to remotely disengage remote start for the vehicle 102, an unlock button that when selected causes the fob application 108 to direct the fob 110 to attempt to unlock the vehicle 102, a lock button that that when selected causes the fob application 108 to direct the fob 110 to attempt to lock the vehicle 102, an open window button that that when selected causes the fob application 108 to direct the fob 110 to attempt to open a window of the vehicle 102, a close window button that that when selected causes the fob application 108 to direct the fob 110 to attempt to close a window of the vehicle 102, a trunk button that that when selected causes the fob application 108 to direct the fob 110 to attempt to unlatch and/or open the trunk of the vehicle 102, and a panic button that when selected causes the fob application 108 to direct the fob 110 to attempt to trigger the vehicle 102 alarm. In an example, to perform the requested functions, the fob application 108 may direct the mobile device 104 to communicate with the fob 110 via BLUETOOTH, thereby causing the fob 110 to communicate with the BLEMs 106 of the vehicle 102 via BLUETOOTH. In another example, the fob application 108 may communicate with the vehicle 102 BLEMs 106 directly.

The user interface 402 further includes a set of screen controls 410 configured to select between various screens of the fob application 108. For instance, the screen controls 410 may provide for selection of display of the home user interface 402, display of a vehicles user interface 502 (discussed in greater detail with regard to FIG. 5), and display of a settings user interface 602 (discussed in greater detail with regard to FIG. 6). In an example, the user interface 402 may have been displaced responsive to selection of the home control from the screen controls 410. Moreover, the screen control 410 corresponding to the currently-displayed user interface may be bolded or otherwise highlighted to indicate the current selection. As shown in the user interface 402, the home screen control 410 is highlighted to indicate that the home user interface 402 is being displayed.

The user interface 402 also may include a status bar 412. The status bar 412 may include information such as an indication of which user interface is currently being displayed (e.g., the home user interface 402 in this example), the charge level of the fob 110 (in this example, 98%), and the mode in which the fob 110 is controlling the vehicle 102 (in this example in valet mode, e.g., as opposed to full access mode.)

Figure 5:
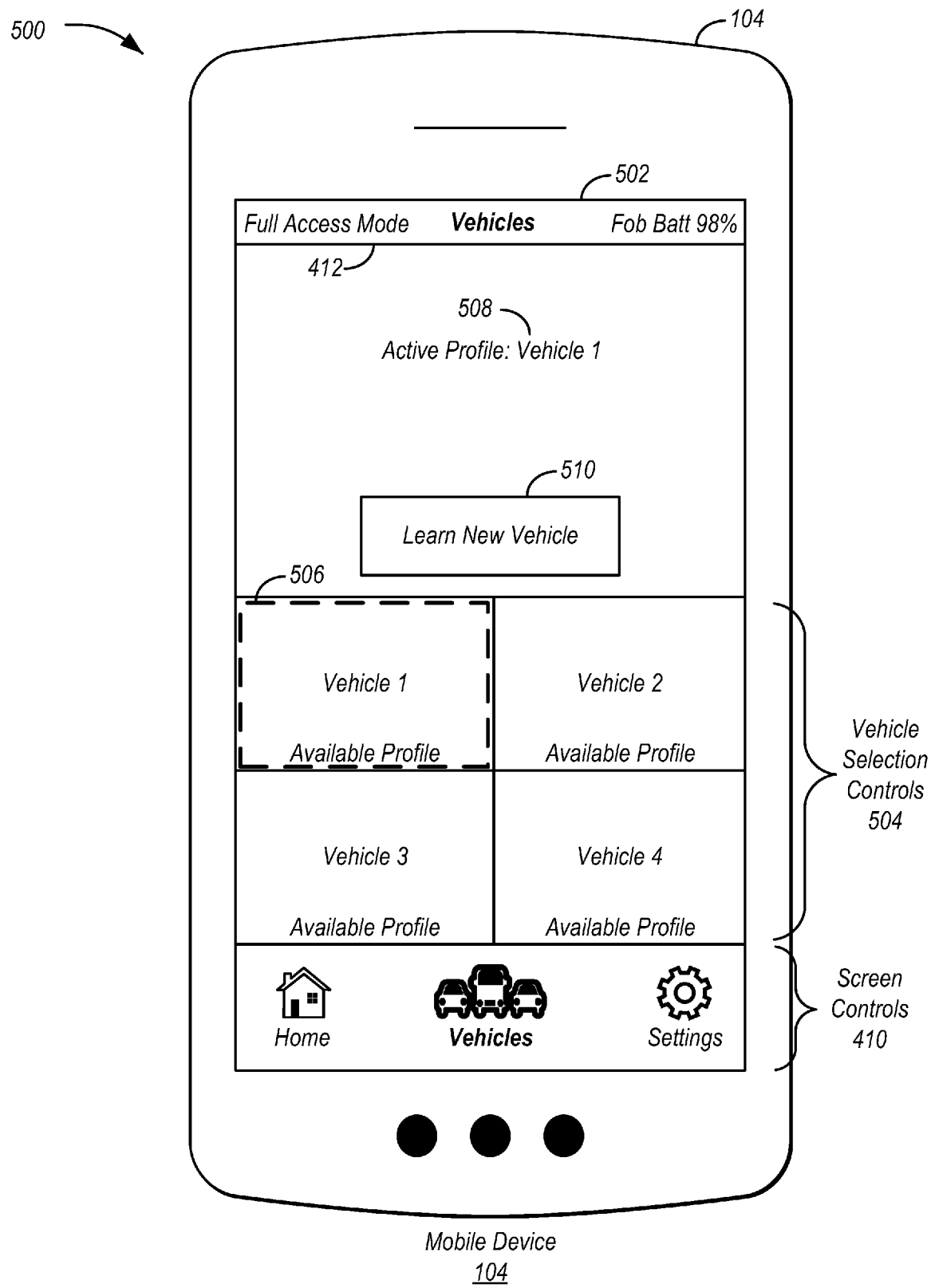
FIG. 5 illustrates an example of a vehicles user interface of the fob application for configuring the vehicles controlled by the fob.

FIG. 5 illustrates an example 500 of a vehicles user interface 502 of the fob application 108 for configuring the vehicles 102 controlled by the fob 110. In an example, the vehicles user interface 502 may be displayed responsive to selection of the vehicles screen control 410.

The vehicles user interface 502 may include vehicle selection controls 504 from which a user may select from one of a set of profiles for different vehicles 102 to be controlled. As shown the system includes a set of four vehicles 102, but this is only an example and the selection may be from more or fewer vehicles 102. As evidenced by the highlight 506, the profile for "vehicle 1" has been selected. The active vehicle profile label 508 also indicates which vehicle profile is active (in this case "vehicle 1").

The user interface 502 also includes a learn new vehicle control 510 that, when selected, provides for the learning of profile information for the vehicle profiles. In an example, the learning of profile information may include selection of one of the vehicle profiles to program (e.g., via selection from vehicle selection controls 504), selection of information to allow the fob application 108 to identify from a lookup table the wireless frequency of operation of the vehicle 102 to be programmed (e.g., selection of a region of operation of the vehicle 102, querying whether the vehicle fob includes a remote start feature, indicating whether the vehicle 102 has pushbutton start), a learning procedure to learn information from a fob currently configured to provide access functions for the vehicle 102, and selection of attributes of the vehicle 102 to make the profile easier to identify (e.g., make, model, color, etc. of the vehicle 102). The fob 110 may also be learned to the vehicle 102, in a manner consistent with learning traditional key fobs 110 to the vehicle 102. Once learned, the vehicle profile may be selected for use from the vehicles user interface 502.

Figure 6:
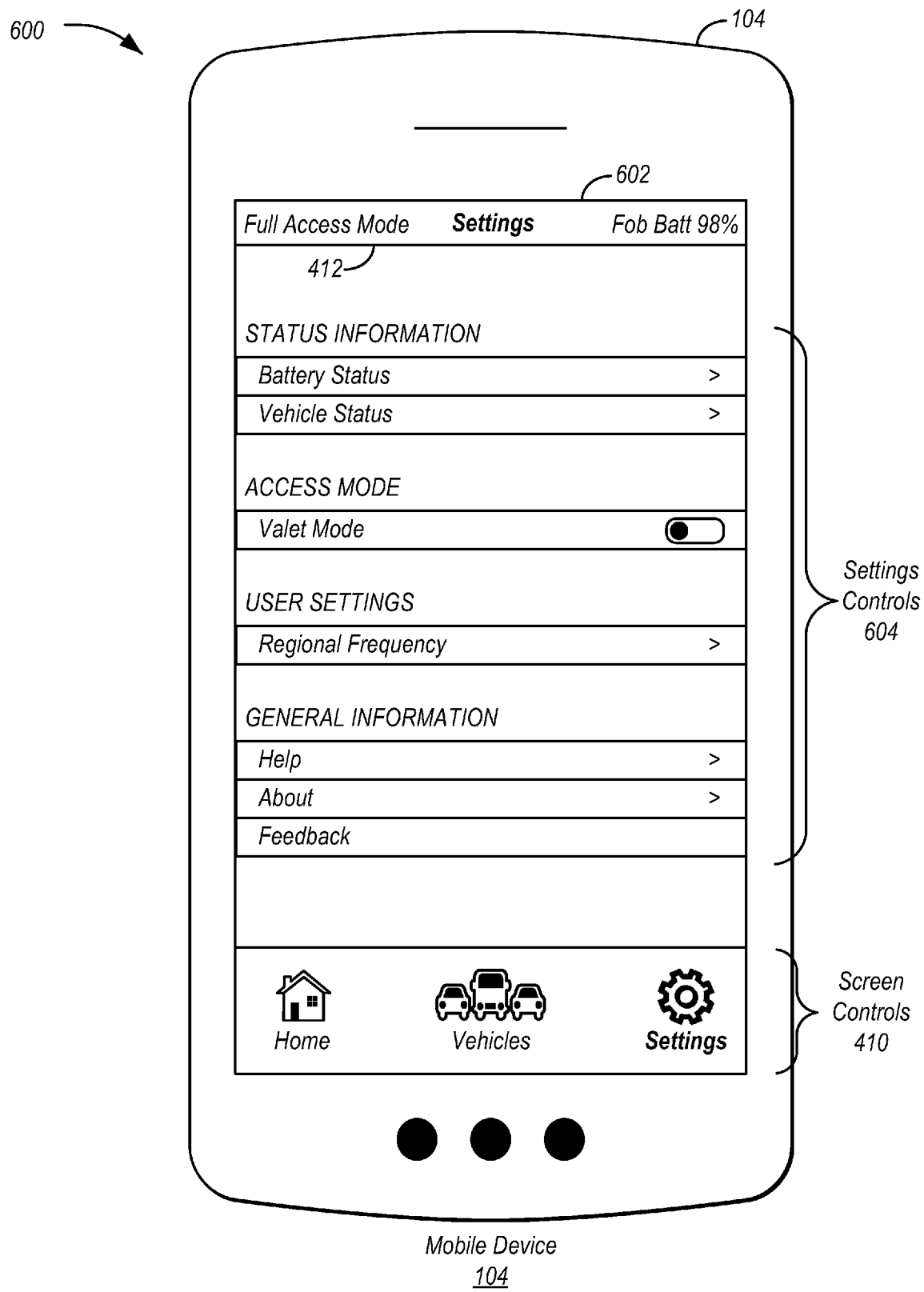
FIG. 6 illustrates an example of a settings user interface for the configuration of fob application settings.

FIG. 6 illustrates an example 600 of a settings user interface 602 for the configuration of fob application 108 settings. As shown, the settings user interface 602 includes various settings controls 604 that may be used to learn about and configure the operation of the fob application 108.

For instance, the settings controls 604 may include a section of controls that provide status information, such as a battery status control that when selected provides details such as battery state of charge for the fob 110, the last time the battery charge level was retrieved, and the type of battery used in the fob 110. The status information may also include a vehicle status control that when selected provides details such as an identification of which vehicle profile is active, a listing of the available vehicle profiles, and whether there are any learned vehicle profiles available.

The settings controls 604 may also include an access mode control that, when selected, allows the user to toggle the fob 110 between full access mode and valet mode. Further aspects of the setup and use of the valet mode are discussed in detail with respect to FIGS. 7-8. The settings controls 604 may also include a regional frequency control that, when selected, allows the user to reconfigure the frequency used by the fob 110. The settings controls 604 may also include a general information section including controls to display help information regarding use of the fob 110 with the fob application 108, an about screen providing information about the fob application 108 itself, and a feedback control that, when selected, allows the user to provide feedback about the fob application 108.

Figure 7:
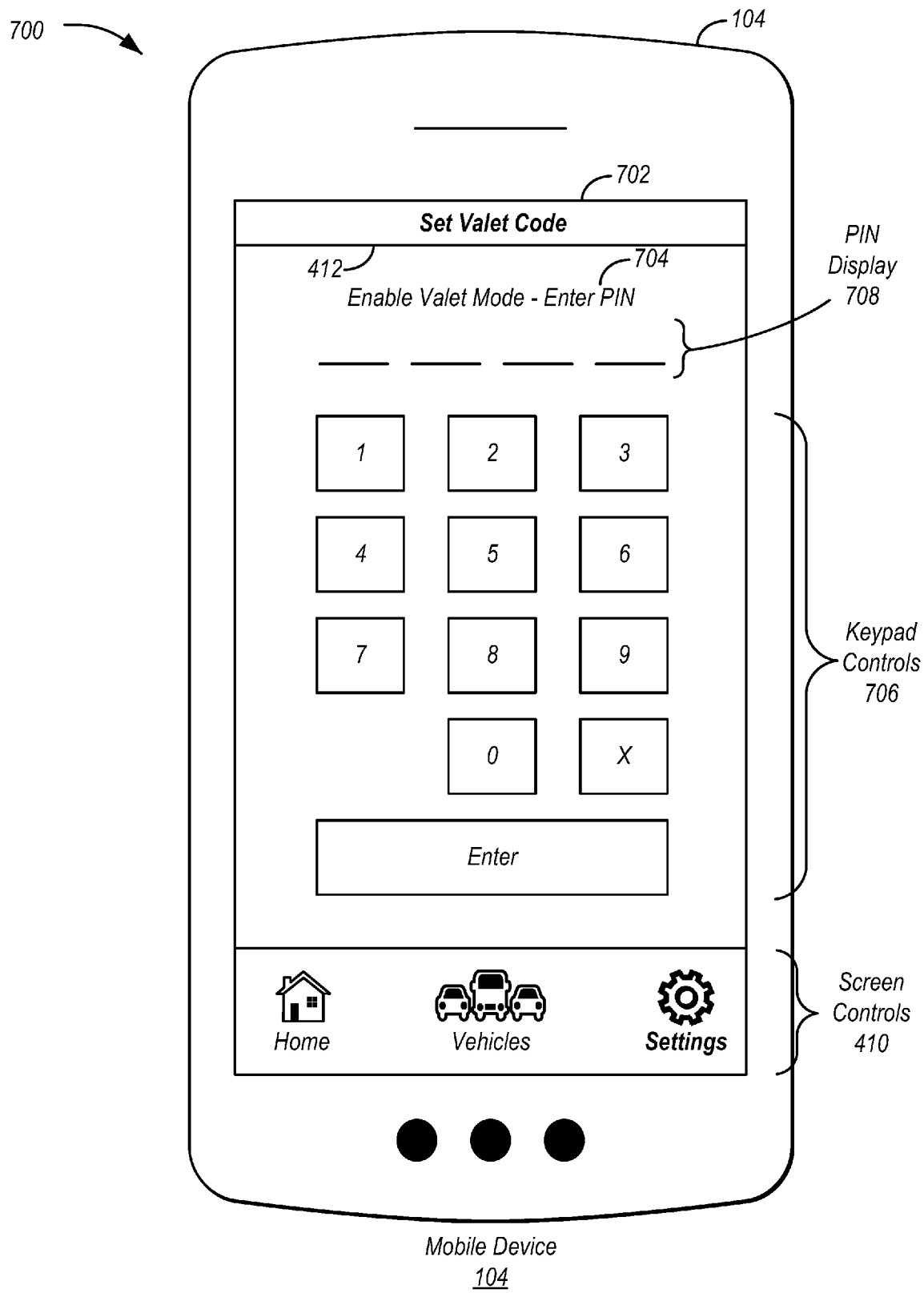
FIG. 7 illustrates an example of a user interface for setting up a personal identification number for valet mode.

FIG. 7 illustrates an example 700 of a user interface 702 for setting up a personal identification number (PIN) for valet mode. In an example, the user interface 702 may be provided responsive to the user selecting to change the fob 110 from full access mode to valet mode using the settings user interface 602.

As shown, the screen controls 410 and status bar 412 are updated to indicate that user interface 702 is for setting a valet code. Additionally, an enter PIN label 704 may be included to direct the user to enter a new PIN for valet mode. The user interface 702 may also include keypad controls 706 through which the user can enter the PIN, as well as a PIN display 708 to illustrate the PIN as it is being entered. Once complete, PIN code will be required to move the fob 110 out of valet mode back into full access mode.

Responsive to entry of the PIN, the fob application 108 may direct the fob 110 to move to valet mode. Once in valet mode, the fob 110 may be detached and used as a fob 110 independent from the mobile device 104, but only with the limited access provided to the vehicle 102 in valet mode.

Figure 8:
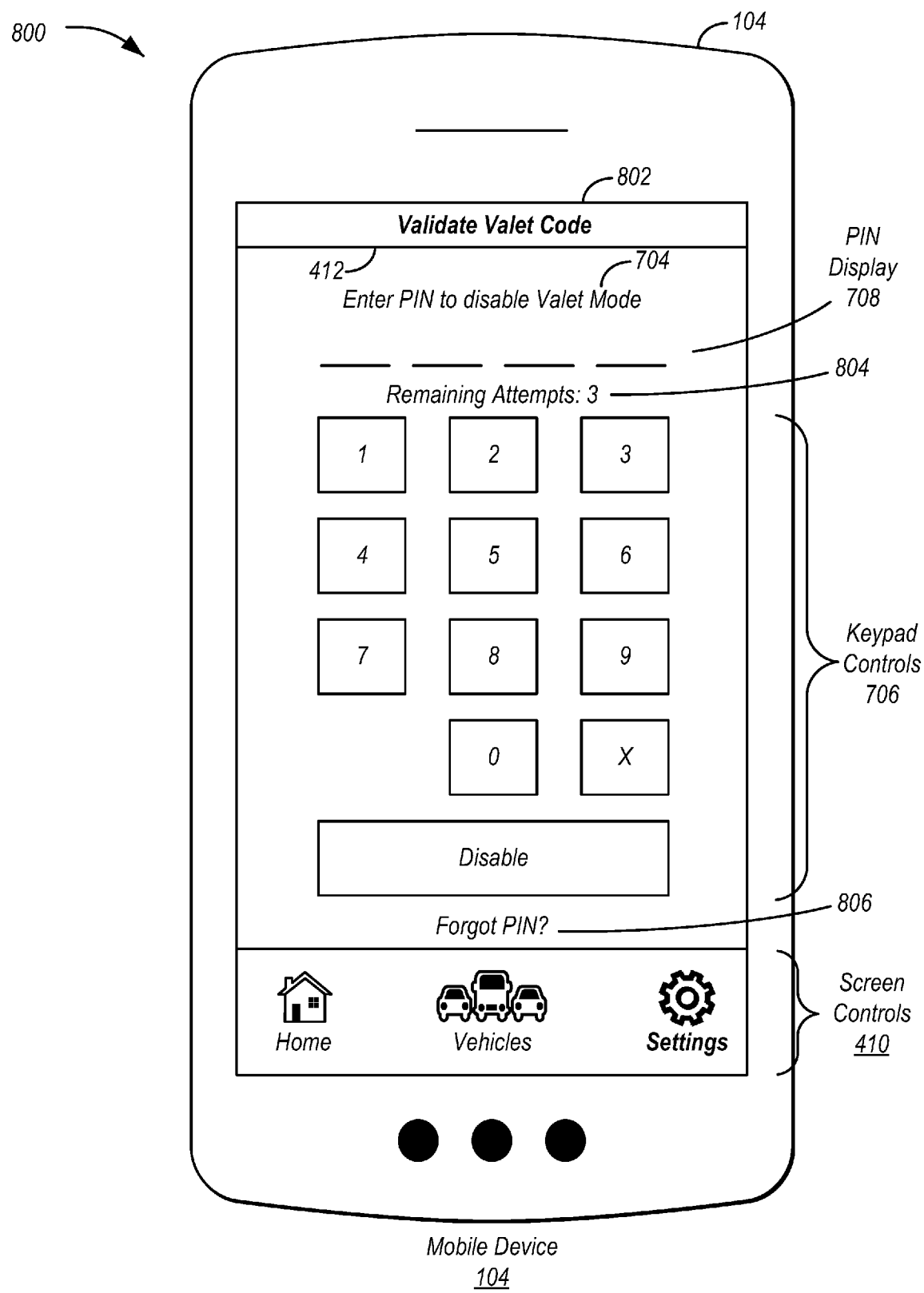
FIG. 8 illustrates an example of a user interface for disabling valet mode.

FIG. 8 illustrates an example 800 of a user interface 802 for disabling valet mode. In an example, the user interface 802 may be provided responsive to the user selecting to change the fob 110 from valet mode to full access mode using the settings user interface 602.

As shown, the status bar 412 is updates to indicate that user interface 802 is for validating an entered valet code. Additionally, an enter PIN label 704 may be included to direct the user to reenter the PIN to exit the valet mode. The user interface 802 may also include keypad controls 706 through which the user can reenter the PIN, as well as the PIN display 708 to illustrate the PIN as it is being entered. The user interface 802 may also include a remaining-attempts label 804 indicating how many retries to reenter the PIN remain, as the user interface 802 may lock after a predefined number of attempts have been completed incorrectly. The user interface 802 may also include a forgotten PIN control 806 that, when selected, allows for the user to attempt to regain access if the PIN is lost.

Figure 9:
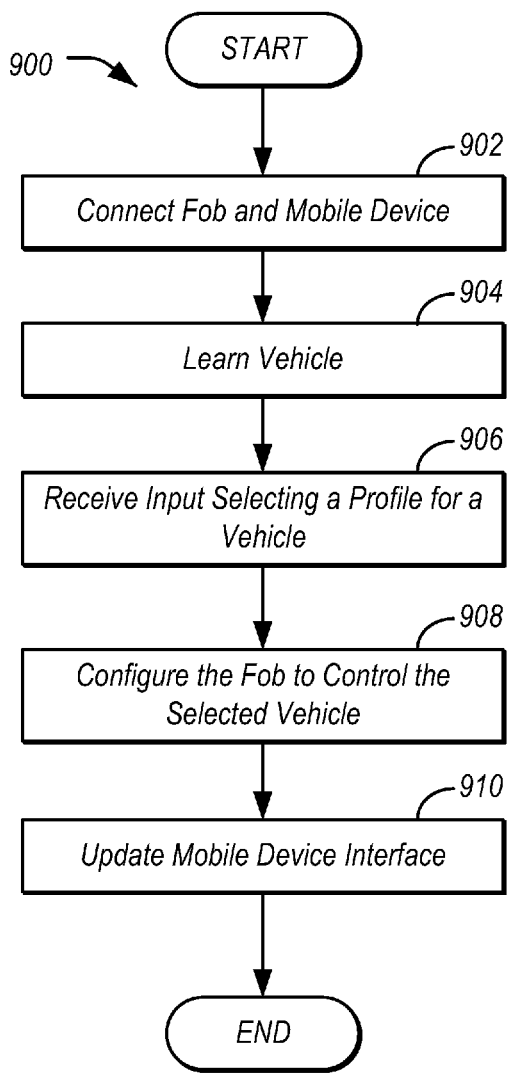
FIG. 9 illustrates an example process for configuring the fob to control a selected vehicle.

FIG. 9 illustrates an example process 900 for configuring the fob 110 to control a selected vehicle 102. In an example, the process 1000 may be performed by the mobile device 104 executing the fob application 108 and configured for communication with the fob 110.

At 902, the mobile device 104 and fob 110 connect. In an example, fob 110 discovery may be activated using the connection control 114, and the mobile device 104 may detect the fob 110.

At 904, the mobile device 104 learns profile information for control of a vehicle 102. In an example, the fob 110 may be learned to the vehicle 102 as is traditional for key fobs. Additionally, the fob 110 may be programmed to one of the vehicle profiles of the fob application 108 as discussed above with respect to the user interface 502.

At 906, the mobile device 104 receives input selecting a profile for a vehicle 102. In an example, the fob application 108 receives a selection from the vehicle selection controls 504 of a vehicle profile to apply to the fob 110.

At 908, the mobile device 104 configures the fob 110 to control the selected vehicle 102. In an example, the mobile device 104 communicates to the fob 110 that a transition is to be made to the selected vehicle profile. Accordingly, the fob 110 may be used to communicate with the BLEM 106 of the vehicle 102, as would otherwise be used to facilitate PaaK operation using the mobile device 104.

At 910, the mobile device 104 updates the user interface of the mobile device 104. In an example, the mobile device 104 may query the fob 110 for the current battery level of the fob 110, and may provide an indication in the user interface of the current state of battery charge of the fob 110. In another example, the mobile device 104 may indicate in the user interface which of the vehicle profiles is active with the fob 110. After operation 912, the process 900 ends.

Figure 10:
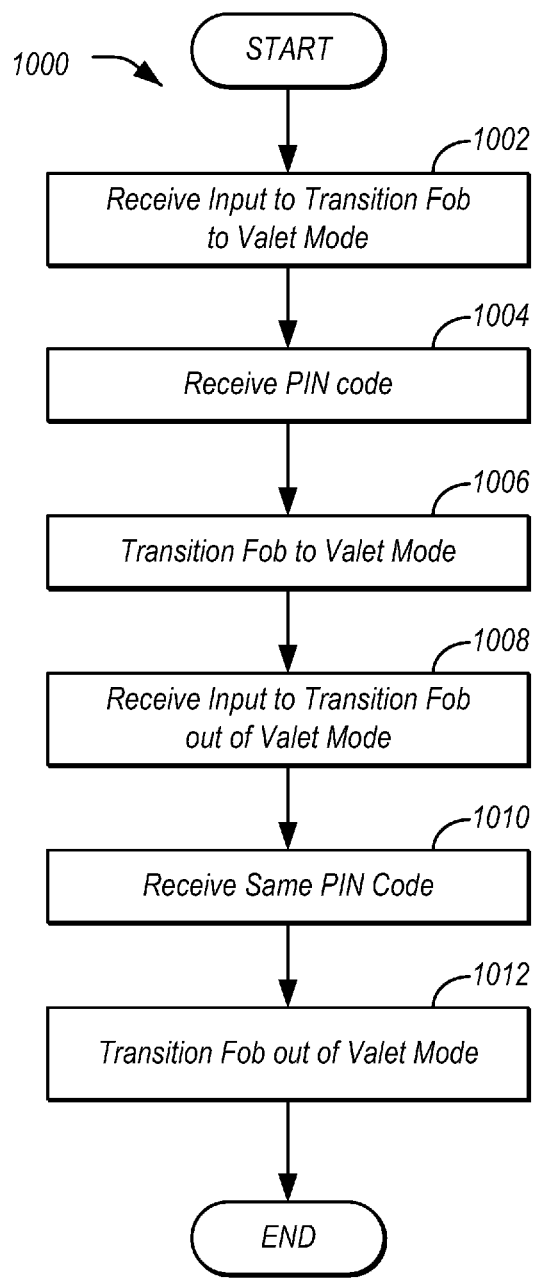
FIG. 10 illustrates an example process for transitioning the fob in and out of valet mode.

FIG. 10 illustrates an example process 1000 for transitioning the fob 110 in and out of valet mode. In an example, the process 1000 may be performed by the mobile device 104 executing the fob application 108 and configured for communication with the fob 110.

At 1002, the mobile device 104 receives input to transition the fob 110 to the valet mode. In an example, the fob application 108 of the mobile device 104 may receive input to the valet mode setting control 604 requesting for the fob 110 to be transitioned from full access mode into valet mode. This may be done, for example, to give the fob 110 to a valet or other driver who should be given only limited rights to the vehicle 102. For instance, while in valet mode the vehicle 102 may have a lower maximum speed, a geofence outside of which the vehicle 102 cannot travel (or if traveled outside notifies the mobile device 104), inability to unlock the glove box or trunk, etc. Additionally, when the fob 110 is in valet mode the fob 110 may be unable to be transitioned to control a different vehicle 102.

At 1004, the mobile device 104 receives a PIN code. In an example, responsive to the input received at operation 1002, the fob application 108 of the mobile device 104 may display the user interface 702 for setting up the PIN. Via the user interface 702, the user may enter a code that is required to transition the fob 110 back to full access mode. In some examples, if a PIN code has been previously set up, that PIN code may be used without the mobile device 104 requesting a new PIN.

At 1006, the mobile device 104 transitions the fob 110 to the valet mode. In an example, the mobile device 104 sends a message over BLUETOOTH to the fob 110 to set the fob 110 into valet mode.

At 1008, the mobile device 104 receives input to transition the fob 110 out of the valet mode. In an example, the fob application 108 of the mobile device 104 may receive input to the valet mode setting control 604 requesting for the fob 110 to be transitioned back to the full access mode.

At 1010, the mobile device 104 receives the same PIN code. In an example, responsive to the input received at operation 1008, the fob application 108 of the mobile device 104 may display the user interface 802 for receiving the previously set up PIN. Via the user interface 802, if the correct PIN is entered, control passes to operation 1012. If the PIN is not entered, the process 1000 ends.

At 1012, the mobile device 104 transitions the fob 110 to the full access mode. In an example, the mobile device 104 sends a message over BLUETOOTH to the fob 110 to set the fob 110 into full access mode. After operation 1012, the process 1000 ends.

Computing devices described herein, such as the mobile device 104 and fob 110, generally include computer-executable instructions where the instructions may be executable by one or more computing devices such as those listed above. Computer-executable instructions, such as those of the fob application 108, may be compiled or interpreted from computer programs created using a variety of programming languages and/or technologies, including, without limitation, and either alone or in combination, JAVA™, C, C++, C#, VISUAL BASIC, JAVASCRIPT, PYTHON, JAVASCRIPT, PERL, PL/SQL, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method comprising:
   transitioning a fob of a user, the fob providing access to a first vehicle, from full access mode into valet mode, by sending a wireless short-range message from a cellular phone of the user to the fob, responsive to receiving first input to a user interface of the cellular phone to set the fob into valet mode;
   transitioning the fob from valet mode into full access mode by sending a second wireless short-range message from the cellular phone to the fob, responsive to receiving second input to the user interface of the cellular phone to remove the fob from valet mode; and
   transitioning the fob from a first profile for controlling the first vehicle to a second profile for controlling a second vehicle, by sending a third wireless short-range message to the fob, responsive to receiving a third input to the user interface of the cellular phone to set the fob to utilize the second profile.

2. The method of claim 1, wherein the first input to the cellular phone to set the fob into valet mode includes entry of a personal identification number (PIN), and the second input to the cellular phone to remove the fob from valet mode includes reentry of the PIN.

3. The method of claim 1, further comprising displaying a mode status by the cellular phone indicating whether the fob is in valet mode or in full access mode.

4. The method of claim 1, wherein one or more of the wireless short-range message, the second wireless short-range message, and the third wireless short-range message are sent using the BLUETOOTH protocol.

5. The method of claim 1, further comprising discovering an advertisement of the fob to connect the fob to the cellular phone.

6. The method of claim 1, further comprising:
   activating fob short-range wireless functionality responsive to input to a fob control of a first duration; and
   entering the fob into advertisement mode for a predefined period of time responsive to input to the fob control of a second duration greater than the first duration.

7. A system comprising:
   a cellular phone and a fob, each corresponding to a user and having a short-range wireless transceiver,
   the cellular phone programmed to, responsive to first user input, transmit a first message using the transceiver of the cellular phone to transition the fob from providing access to a first vehicle in a full access mode into providing access to the first vehicle in a valet mode, the fob being programmed to, using the fob transceiver, receive the first message and transition from the full access mode to the valet mode,
   the cellular phone further programmed to, responsive to second user input, transmit a second message using the transceiver of the cellular phone to transition the fob from providing access to the first vehicle in the valet mode into providing access to the first vehicle in the full access mode, the fob being programmed to, using the fob transceiver, receive the second message and transition from the valet mode to the full access mode, and
   the cellular phone further programmed to, responsive to third user input, transmit a third message using the transceiver of the cellular phone to transition the fob from being configured to utilize a first vehicle profile to control the first vehicle to instead being configured to utilize a second vehicle profile to control a second vehicle, the fob being programmed to, using the fob transceiver, receive the third message and control the second vehicle.

8. The system of claim 7, wherein the cellular phone is further programmed to display a user interface including a plurality of vehicle selection controls, each vehicle selection control corresponding to a different vehicle to be controlled by the fob, the different vehicle to be controlled including at least the first vehicle and the second vehicle, wherein the third user input includes a selection to one of the vehicle selection controls.

9. The system of claim 8, wherein the cellular phone is further programmed to display, in the user interface, an indication of which vehicle is currently configured to be controlled by the fob.

10. The method of claim 1, further comprising displaying a user interface including a plurality of vehicle selection controls, each vehicle selection control corresponding to a different vehicle to be controlled by the fob, the different vehicle to be controlled including at least the first vehicle and the second vehicle, wherein the third user input includes a selection to one of the vehicle selection controls.

11. The method of claim 10, further comprising displaying an indication of which vehicle is currently configured to be controlled by the fob.

12. The system of claim 7, wherein the first input to the cellular phone to set the fob into valet mode includes entry of a personal identification number (PIN), and the second input to the cellular phone to remove the fob from valet mode includes reentry of the PIN.

13. The system of claim 7, wherein the cellular phone is further programmed to display a mode status by the cellular phone indicating whether the fob is in valet mode or in full access mode.

14. The system of claim 7, wherein one or more of the first message, the second message, and the third message are sent using the BLUETOOTH protocol.

15. The system of claim 7, wherein the fob is further programmed to send an advertisement of the fob, and the cellular phone is further programmed to discover the advertisement of the fob to connect the fob to the cellular phone.

16. The system of claim 7, wherein the fob is further programmed to:
  activate fob short-range wireless functionality responsive to input to a fob control of a first duration; and
  enter the fob into advertisement mode for a predefined period of time responsive to input to the fob control of a second duration greater than the first duration.

* * * * *